United States Patent [19]

Ballard et al.

[11] 4,189,091
[45] Feb. 19, 1980

[54] FURNACE HAVING A NORMALLY CLOSED BLOWER RELAY

[75] Inventors: Gary W. Ballard, Brownsburg, Ind.; Robert A. Freliech, Fayetteville, N.Y.

[73] Assignee: Carrier Corporation, Syracuse, N.Y.

[21] Appl. No.: 846,869

[22] Filed: Oct. 31, 1977

[51] Int. Cl.² ............................................. F24D 5/00
[52] U.S. Cl. ...................................... 236/11; 361/37; 417/12
[58] Field of Search ................. 236/11, 1 C, 9 A; 165/25–27; 361/37, 1; 417/12

[56] References Cited

U.S. PATENT DOCUMENTS

| 2,467,425 | 4/1949 | Cobb | 236/11 |
|---|---|---|---|
| 2,615,634 | 10/1952 | Harbin, Jr. | 236/9 |
| 2,656,111 | 10/1953 | Lehane et al. | 236/9 A |
| 2,704,571 | 3/1955 | Peicheldefer | 236/11 X |
| 2,801,055 | 7/1957 | Seifert | 236/9 |
| 2,862,666 | 12/1958 | Kriechbaum | 236/9 |
| 3,223,325 | 12/1965 | Letourneau | 236/9 A |
| 3,544,003 | 12/1970 | Bisaell, Jr. | 236/11 |
| 3,587,558 | 6/1971 | Raleigh | 126/113 |
| 3,664,414 | 5/1972 | Raleigh | 165/26 |
| 3,776,214 | 12/1973 | Coffman | 236/11 X |
| 4,055,297 | 10/1977 | Lee | 236/11 |

Primary Examiner—William E. Wayner
Attorney, Agent, or Firm—J. Raymond Curtin; Robert P. Hayter

[57] ABSTRACT

A furnace having a burner fired heat exchanger with a flue gas passage and a heated air passage, a blower powered by an electric motor for circulating the heated air and an electric control circuit with a normally closed relay connecting the blower motor to the power source, the relay being controlled by a "Schmitt trigger" connected to a timing combination.

7 Claims, 3 Drawing Figures

FURNACE HAVING A NORMALLY CLOSED BLOWER RELAY

BACKGROUND OF THE INVENTION

1. FIELD OF THE INVENTION

The present invention relates to fuel fired furnaces. More specifically, the present invention relates to controls for the air circulating blower in a hot air furnace.

2. PRIOR ART

Many types of blower controls have previously been used to provide safe and efficient operation of a hot air furnace. Blower operation is optimally designed to allow the furnace heat exchanger to achieve operating temperatures prior to blower operation and to allow the heat exchanger to cool before blower operation is discontinued. An over-temperature limit switch in the event of high bonnet temperature is usually included as a safety feature to commence blower operation regardless of the temperature of the space to be heated should the bonnet temperature within the furnace reach a predetermined high level.

Typical examples of blower control circuits include U.S. Pat. Nos. 3,554,003, 3,587,558 and 3,664,414; all issued to Raleigh and assigned to the assignee hereof. These patents all include a temperature responsive switch for actuating the blower motor. Other United States Patents having temperature dependent relays controlling blower operation include: Kriechbaum U.S. Pat. No. 2,862,666; Coffman U.S. Pat. No. 3,776,214; Seifert U.S. Pat. No. 2,801,055; and Reichelderfer U.S. Pat. No. 2,704,571. In U.S. Pat. No. 2,615,634, issued to Harbin, there is disclosed a manual switch in combination with a variable speed relay for controlling a furnace blower motor.

None of this cited art discloses the use of normally closed relay contacts within the blower motor circuit controlled by a time-delay circuit. The advantages of this control method include blower operation in the event of a control circuit failure such as loss of current or voltage within the control circuit or the blower relay; continuous blower operation upon failure will signal malfunction to the operator; and, blower response is immediate since there are no thermal delays in the system.

SUMMARY OF THE INVENTION

It is an object of the invention to operate a safe efficient control circuit for the blower motor of a hot air furnace.

It is another object of the present invention to install a normally closed relay so that upon control circuit failure the blower operation will continue.

It is a further object of the invention to provide an economical and reliable control circuit for a hot air furnace.

It is another object of the present invention to utilize a single pole-single throw low voltage switch for over-temperature protection within the blower control circuit.

Other objects will be apparent from the description to follow and from the appended claims.

The preceding objects are achieved according to a preferred embodiment of the invention by the provision of a normally closed relay connecting a blower motor to a power source. The normally closed relay is controlled by a resistance capacitance timing circuit which is activated when the thermostat calls for heating. An integrated circuit compares the voltage buildup or discharge in the resistance capacitance timing circuit with predetermined reference voltage levels. When the predetermined reference levels are reached, the integrated circuit either deenergizes the relay to commence operation of the blower or engages the relay to discontinue operation of the blower. A single pole-single throw over-temperature limit device is provided to automatically disengage the blower relay when the furnace is overheated, thereby insuring blower operation.

DESCRIPTION OF THE PREFERRED EMBODIMENT

The embodiment of the invention described below is adapted for use in a residential furnace application, although it is to be understood that the invention finds like applicability in other forms of furnaces and various heating implements. The furnace control circuits described below will have equal import to circuits for use with other heating instruments including commercial and industrial uses.

The typical hot air furnace has a heat exchanger fired by a burner, usually using natural gas or fuel oil as a source of energy, and a fuel regulator controlling the amount of fuel flow to the burner. The fuel is burned within the heat exchanger and exhaust gases travel the length of the heat exchanger and are discharged into the atmosphere external of the enclosure to be heated. Room air to be heated is circulated by a blower over the outside of the heat exchanger thereby absorbing heat from the flue gases. This now heated air is circulated to the areas to be heated and simultaneously cold air may be withdrawn from those areas.

Figure 1:
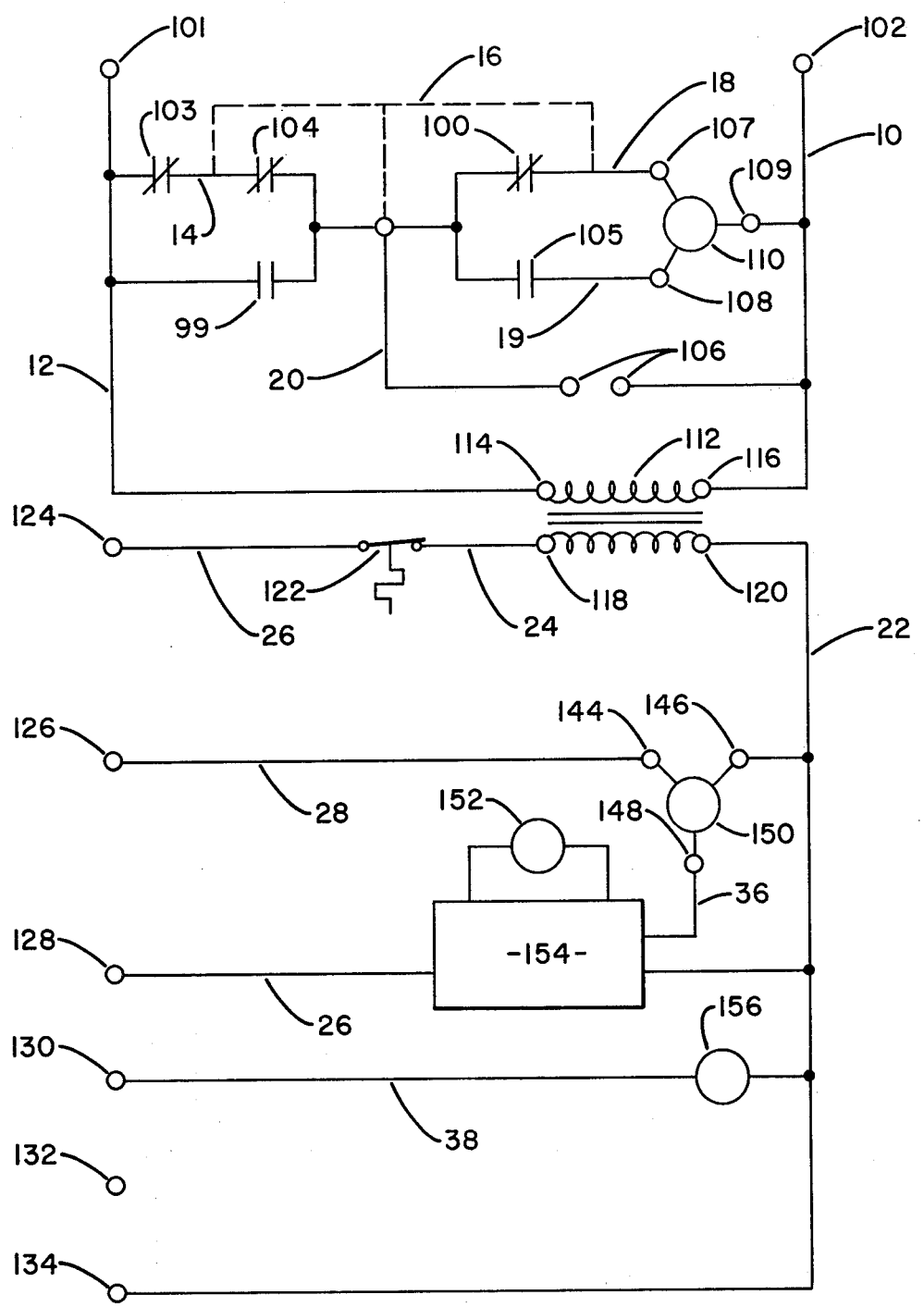
FIG. 1 is a schematic diagram of the wiring circuit of a hot air furnace.

Referring to the drawings, FIG. 1 is a schematic diagram of the wiring of a typical hot air furnace. This wiring diagram is adapted to be used with a printed circuit board and the terminals are labeled as they would be in a printed circuit board so the various components may be quickly and easily connected to each other and the printed circuit board. As can be seen in FIG. 1, power is received by the furnace thru terminals 101 and 102. Normally these terminals receive power from the electrical circuitry of the home or other area where the heating is being utilized. Wire 12 connects terminal 101 to terminal 114, primary winding 113 of transformer 112, to normally open cooling blower relay contacts 99, and to normally closed heating blower relay contacts 103. Wire 10 connects terminal 102 to terminal 116 of transformer 112, to terminal 111 of electronic air purifier 106 and to common terminal 109 of blower motor 110. Wire 14 connects normally closed heating blower relay contacts 103 with normally closed cooling blower relay contacts 104. Wire 20 connects terminal 98 of electronic air purifier 106 with cooling blower relay contacts 99, 104, 100 and 105. Wire 18 connects normally closed cooling blower relay contacts 100 with low speed motor terminal 107. Wire 19 connects normally open cooling blower relay contacts 105 with high speed blower motor terminal 108. Between terminals 114 and 116 is mounted primary winding 113 of transformer 112. Jumper wire 16 connects wires 14 and 20 to low speed motor terminal 107.

The secondary winding 121 of the transformer is mounted between terminals 118 and 120 of the control circuit portion of the wiring diagram, the control circuit portion being that portion of the circuit operating at the lesser voltage level generated from the secondary winding of the transformer. Connected to terminal 120 of the secondary winding of transformer 112 is wire 22 which is also connected to terminal 146 of gas regulator valve 150, to time delay relay circuit 154, to cooling blower relay 156 which controls cooling blower relay contacts 99, 100, 104 and 105 and to common terminal 134. Wire 24 connects secondary terminal 118 and over-temperature limit switch 122 and wire 26 connects the over-temperature limit switch to terminal 124. Wire 26 connects terminal 128 and time delay relay circuit 154. Wire 28 connects terminal 126 to terminal 144 of gas regulator valve 150. Blower relay 152 which controls normally closed heating blower relay contacts 103 is connected to the time delay relay circuit 154. Also connected to time delay relay circuit by wire 36 is gas regulator valve terminal 148. Terminal 130 is connected to cooling blower relay 156 by wire 38.

Figure 2:
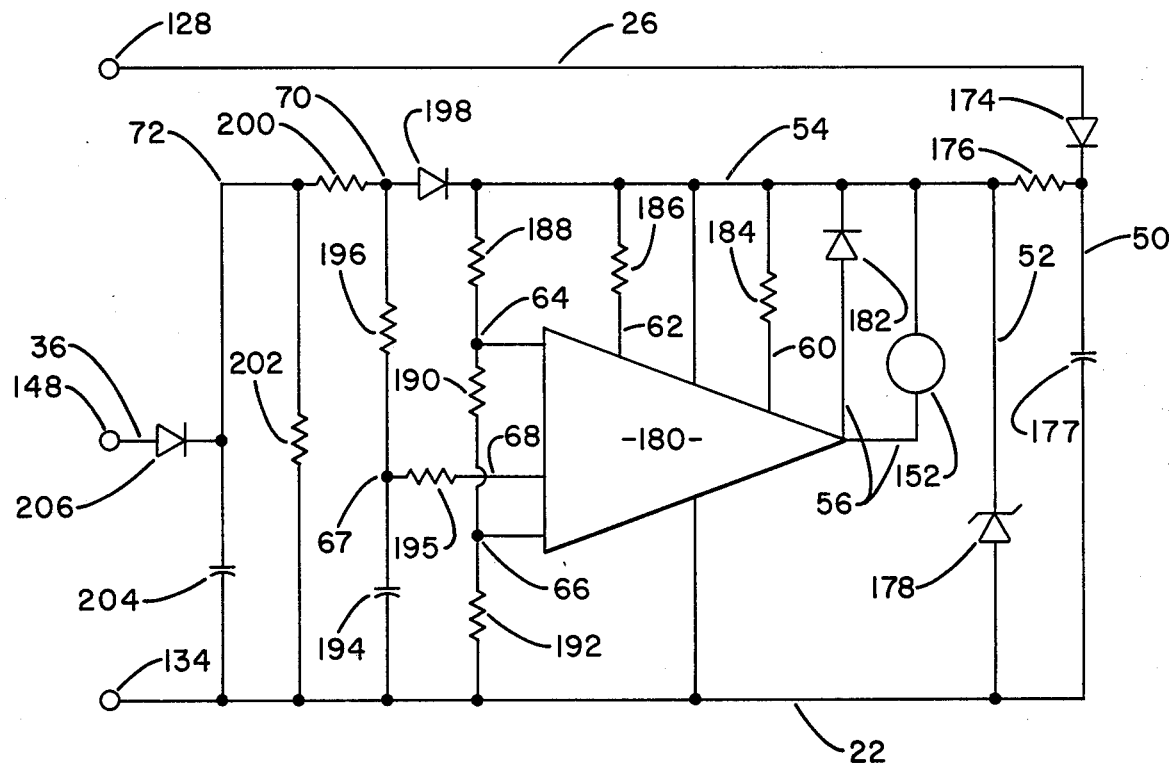
FIG. 2 is a schematic wiring diagram of the time-delay relay circuit shown in FIG. 1.

As shown in FIG. 2, the schematic diagram of the time-delay relay circuit as shown in FIG. 1, terminal 128 is connected by wire 26 to diode 174 which is connected by wire 50 to resistor 176 and capacitor 177. Capacitor 177 is connected by wire 22 to terminal 134, capacitor 204, resistor 202, capacitor 194, resistor 192, a terminal of integrated circuit 180 and to zener diode 178. Wire 52 connects zener diode 178 to resistor 176. Wire 54 connects wire 52 to heating blower relay 152, diode 182, resistor 184, a terminal of integrated circuit 180, resistor 186, resistor 188 and diode 198. Gas terminal 148 is connected by wire 36 to diode 206 which is connected by wire 72 to capacitor 204, resistor 202 and resistor 200. Resistor 200, diode 198 and resistor 196 are all connected by wire 70. Wire 68 connects resistor 196 with capacitor 194 and with a terminal of integrated circuit 180. Wire 66 connects resistors 192 and 190 with a terminal of integrated circuit 180. Wire 64 connects resistor 188 and resistor 190 with a terminal of integrated circuit 180. Wire 62 connects resistor 186 with a terminal of integrated circuit 180. Wire 60 connects resistor 184 with a terminal of integrated circuit 180. Wire 56 connects heating blower relay 152 and diode 182 with a terminal of integrated circuit 180.

Figure 3:
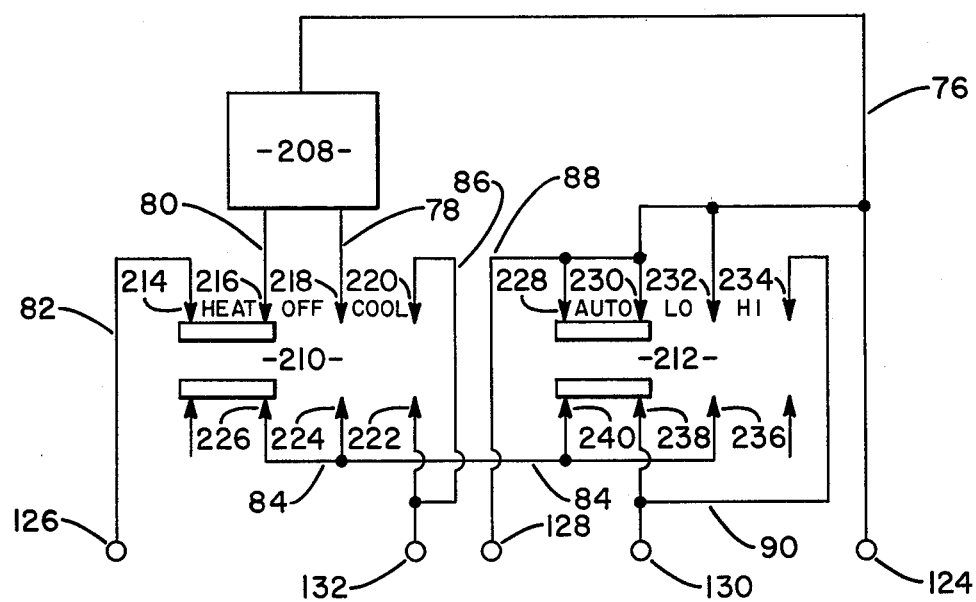
FIG. 3 is a schematic wiring diagram of a thermostat having multiple fan speed selection contained therein.

Referring to FIG. 3, which is a diagram of the thermostat portion of the circuit, it can be seen that wire 76 connects thermostat 208 to terminal 124 and to terminals 230 and 232 of blower speed switch 212. Thermostat 208 is connected by wire 80 to terminal 216 of system switch 210 and by wire 78 to terminal 218 of the system switch 210. Wire 82 connects terminal 126 to terminal 214 of the system switch. Terminals 226 and 224 of the system switch are connected by wire 84 to terminals 240 and 236 of the blower speed switch 212. Wire 86 connects terminals 220 and 222 of the system switch with terminal 132. Wire 88 connects terminal 228 of the blower speed switch with terminal 128. Wire 90 connects terminal 234 of the blower speed switch with terminal 238 of the blower speed switch and terminal 130.

OPERATION

During operation of the furnace 115 volt power is received by terminals 101 and 102 to operate the furnace. As can be seen in FIG. 1, when there is a demand for heat, heating blower relay 152 is not energized and heating blower contact 103 as well as cooling blower relay contacts 104 and 100 are closed and the blower motor will be operated at low speed thru terminal 107. In the cooling mode of operation, cooling blower relay contacts 104, 100, 99 and 105 will reverse positions and the blower motor will be operated through terminal 108 in the high speed mode of operation. In either mode of blower speed operation, electronic air purifier 106 may be operated through terminals 98 and 111 connected by wires 20 and 10. A jumper wire 16 is provided as part of the printed circuit board should only a one speed motor be desired. In such event the jumper wire is left in place and the heating blower relay contacts 103 are the only contacts that may interrupt the motor control circuit. When a multi-speed blower is being used, a hole is punched through the printed circuit board and through wire 16 whereby a discontinuity is created in the jumper and the current must flow through heating blower relay 103 as well as cooling blower relay contacts 104 and 100 or thru cooling blower relay contacts 99 and 105 to power the blower motor.

Power is supplied to the control circuit of the furnace by transformer 112. Typically 115 volt current enters the primary winding of the transformer through terminals 114 and 116 and 24 volt current is received at the secondary terminals 118 and 120. Upon startup, the control circuit current passes from the secondary terminals through the over-temperature limit switch 122 to terminal 124 and thru the room thermostat (not shown), to terminal 128 and to the time delay relay circuit 154. The time delay relay circuit is so arranged that when the furnace is initially connected the circuit will energize heating blower relay 152 to hold heating blower relay contacts 103 in the open position preventing the blower from operating. If the cooling mode of operation is desired the cooling blower relay 156 is energized through terminal 130 to close normally open blower relay contacts 99 and 105, and open normally closed contacts 100 and 104 to allow the blower motor to be operated through terminal 108.

When heating is desired the thermostat energizes terminal 126 through wires 80 and 82. Terminal 126 energizes gas terminal 144 of gas regulator valve 150 which activates gas terminal 148. Terminal 148 through wire 36 engages diode 206 of the time-delay relay circuit which applies current to capacitor 194 and resistor 196 (FIG. 2). Capacitor 194 and resistor 196 are so arranged that voltage builds at a predetermined rate in capacitor 194 upon startup of the unit. When the heating requirements of the enclosure have been satisfied, the current from the thermostat is discontinued allowing the voltage level of capacitor 194 to decay at a predetermined rate thereafter.

The time-delay relay circuit is powered through terminal 128, through diode 174 which converts the AC current into DC current, then through resistor 176, capacitor 177, and zener diode 178 to create a relatively steady state flow of direct current to the remainder of the time-delay relay circuit. Integrated circuit 180 is provided to compare the voltage received from capacitor 194 with the regulated voltages between wires 54 and 22 across the circuit formed by resistor 188, wire 64, resistor 190, wire 66 and resistor 192. A typical integrated circuit for achieving this function is known as a "Schmitt trigger" and is commercially produced by RCA such as integrated circuit model number CA3098E. (See RCA Solid State Division Publication entitled "Linear Integrated Circuits", Programmable Schmitt Trigger With Memory, File number 896 and printed in September 1975. Therein is disclosed a typical voltage reference comparison device.) The integrated circuit then compares the voltage being emitted by capacitor 194 with the reference voltages received through wires 64 and 66. When voltage emitted by capacitor 194 exceeds the reference voltage received through wire 64 the integrated circuit then disengages heating blower relay 152 allowing the blower to operate. During operation of the blower motor, when the voltage being discharged from capacitor 194 is less than the reference voltage received from wire 66, the integrated circuit then energizes heating blower relay 152 discontinuing operation of the blower. The time-delay between ignition of the fuel burner and the commencement of blower operation is approximately 75 seconds as is the time-delay following the discontinuance of the blower operation as a result of the voltage drop from capacitor 194.

Current is received by a thermostat (FIG. 3) from terminal 124 which is connected to terminal 118 of transformer 112. When cooling is required, thermostat 208 energizes wire 78 which may be then connected by system switch 210 to terminal 132. When heating is required, thermostat 208 energizes wires 80 and 82 which are connected to terminal 126 for energizing the time-delay relay circuit and the gas regulating valve. Blower speed switch 212 also receives power from wire 76 and is connected when in the automatic position to terminal 128 by wire 88. In the low speed position, the blower speed switch 212 is connected to terminal 130 for operation of the cooling blower relay. In the high speed position the blower speed switch is also connected to cooling blower relay 156 through terminal 130.

SUMMARY

From the above description of the preferred embodiment of the invention it is apparent that a blower motor controlled by a normally closed set of relay contacts has several advantages. Should transformer 112 malfunction or should there be a loss of voltage or current to heating blower relay 152, motor 110 will operate to prevent overheating since heating relay contacts 103 are in the normally closed position. Continuous operation rather than the normal series of on-off cycles will signal malfunction to the operator. Furthermore over temperature limit switch 122 needs to only break the current source to the heating blower relay to commence blower operation. There are no thermostats to be heated or other temperature sensing devices necessary in normal furnace operation to control the delay periods. By providing positive electrical control with a timing circuit the inherent thermal delays of temperature sensing devices are avoided.

The above described invention has been described with particular reference to preferred embodiment thereof but it will be understood that variations and modifications can be effected within the spirit and the scope of the invention.

We claim:

1. In a furnace having a fuel burner supplied by a fuel regulator, a heat exchanger fired by the burner having a flue gas passage and a heated air passage, a blower powered by an electric motor for circulating the heated air, a thermostat for determining when heating is required, a power source for supplying current to the furnace blower motor and the thermostat, an improved blower control circuit which comprises:

normally closed blower relay contacts connecting the blower motor to the power source; and
   a time-delay relay circuit controlling the blower relay contacts, said circuit being energized by the power source and being connected to the thermostat such that when heating is required an electric signal is received from the thermostat, the time-delay relay circuit including:
   a. timing means for creating an electric signal upon the elapse of a delay period after the receipt of the thermostat signal, and for creating a delay period after the discontinuance of the thermostat signal;
   b. a blower motor relay for controlling the blower relay contacts, said relay being energized to discontinue blower operation; and
   c. actuating means connected to the relay and the timing means, said actuating means receiving the electric signal from the timing means and determining therefrom whether or not to deenergize the relay and thereby operate the blower.

2. The invention as set forth in claim 1 wherein the timing means is a resistance-capacitance circuit whereby when the thermostat calls for heat the voltage of the current emitted by the capacitor builds to a predetermined level upon the elapse of the delay period, and, upon the discontinuance of the thermostat signal the capacitor discharges to a predetermined level upon the elapse of a second time delay period.

3. The invention as set forth in claim 2 wherein the actuating means is a "Schmitt Trigger" device capable of sensing the voltage emitted by the capacitor and therefrom determining whether or not to deenergize the relay.

4. The invention as set forth in claim 3 wherein the actuating means further includes a high reference voltage source and a low reference voltage source to which capacitor voltage may be compared.

5. A method for controlling the operation of a blower in a furnace having a fuel burner supplied by a fuel regulator, a heat exchanger fired by the burner having a flue gas passage and a heated air passage, a blower powered by an electric motor for circulating the heated air, a thermostat for determining when heating is required, a power source for supplying current to the furnace and the thermostat which comprises the steps of:

connecting the blower motor to a power source with a normally closed relay;
   energizing the relay for de-energizing the motor when blower operation is not desired;
   discontinuing the step of energizing the relay when blower operation is desired;
   receiving a continuous signal from the thermostat when heating is required;
   delaying for a predetermined period after receiving the thermostat signal before commencing blower operation; and
   deferring for a predetermined period after termination of the thermostat signal before terminating blower operation.

6. The method as set forth in claim 5 wherein the steps of delaying and deferring include the steps of:
charging a capacitor upon receipt of the thermostat signal;
discharging the capacitor upon termination of the thermostat signal; and
sensing the voltage present at the capacitor to control a relay for discontinuing the energization of the blower motor.

7. The method as set forth in claim 6 wherein the step of sensing includes the step of comparing the voltage on the capacitor with a high reference voltage source and a low reference voltage source.

* * * * *